United States Patent [19]

Barnes et al.

[11] 4,312,244
[45] Jan. 26, 1982

[54] POWER GEARING

[75] Inventors: Philip E. Barnes, West Hartford; Millard G. Mayo, Wethersfield, both of Conn.

[73] Assignee: United Technologies Corporation, Hartford, Conn.

[21] Appl. No.: 143,237

[22] Filed: Apr. 24, 1980

[51] Int. Cl.³ .......................... F16H 57/12; F16H 1/06
[52] U.S. Cl. .......................................... 74/410; 74/414
[58] Field of Search .................. 74/410, 411, 665 GA, 74/406, 409, 413, 414

[56] References Cited

U.S. PATENT DOCUMENTS

| | | | |
|---|---|---|---|
| 2,895,342 | 7/1959 | Hayhurst | 74/409 |
| 3,036,475 | 5/1962 | Haupt | 74/410 |
| 3,064,490 | 11/1962 | Sigg | 74/410 |
| 3,381,509 | 5/1968 | Gay | 74/410 |
| 3,733,926 | 5/1973 | Hope et al. | 74/410 |
| 4,043,216 | 8/1977 | Steer | 74/410 |

Primary Examiner—C. J. Husar
Assistant Examiner—Conrad Berman
Attorney, Agent, or Firm—Charles A. Warren

[57] ABSTRACT

Where a single output gear is driven from a single input pinion through a pair of idler gears and equal torque division between the two idlers is accomplished by floating the input pinion between the two idlers in a yoke that is hinged to the gear housing by spaced hinge pins. One hinge pin is located on the resultant load line from the points where the pinion meshes with the idlers and the other pin has a small clearance to allow the yoke to pivot about the first or loaded pin. Lubrication by oil under pressure for both pins assures a damping action at the loose pin.

4 Claims, 3 Drawing Figures

4,312,244

POWER GEARING

BACKGROUND OF THE INVENTION

The concept of driving a single output gear through a pair of idler pinions from the single input gear is desirable in order to reduce gear tooth loading and to reduce gear sizes and gear box dimensions with a resulting reduction in weight of the unit. Uniform load distribution or a torque split between the idlers is essential to obtain the advantages of this concept. However, with rigid gear mountings, tolerances in manufacturing make it impossible to obtain a consistently equal torque split between the pinion and the two idlers, and therefore it is impossible to take full advantage of the benefits available from the power split.

SUMMARY OF THE INVENTION

One feature of the invention is a hinged mounting for the input pinion bearing so that the pinion may center itself between the idler gears. Another feature is the location of a hinge pin on the resultant load line from the two points of contact with the idler gears such that lateral loads on the yoke are balanced. Another feature is a second hinge pin that has a freedom of movement with the yoke to limit yoke movement and to damp effectively such movement as occurs.

Another feature is a provision for operating the gear system in either direction merely by changing the two hinge pins.

According to the invention, the input pinion is carried by a yoke that is pivoted on the gear box by a pivot pin on an axis parallel to the pinion axis and with a freedom of pivotal movement to permit the pinion to center itself between the pair of idlers with which it meshes. A second limiting pin spaced from and parallel to the first has a loose fit to permit and control the limited pivotal movement about the pin. The pivot pin is located so the resultant load line from the two points of mesh with the idler gears passes through the pinion axis and the pivot pin. Direction reversal is possible by changing the two hinge pins and by having the second pin location such that upon a direction reversal the resultant load line will pass through the pinion axis and this second pin axis.

The foregoing and other objects, features and advantages of the present invention will become more apparent in the light of the following detailed description of preferred embodiments thereof.

DETAILED DESCRIPTION OF THE PREFERRED EMBODIMENT

Figure 1:
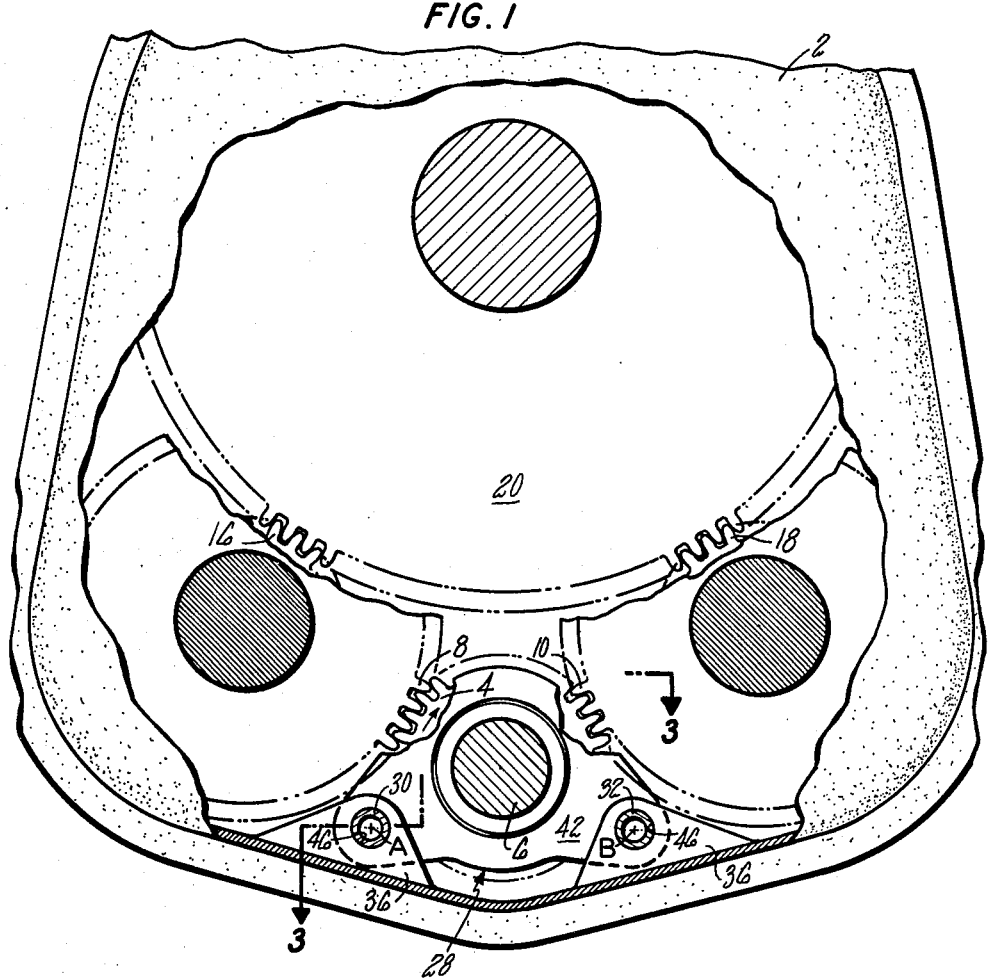
FIG. 1 is an end elevation of the series of gears in a gear box, the cover being removed.
Figure 3:
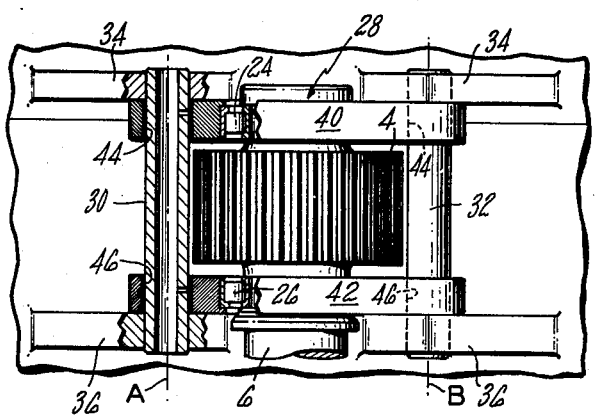
FIG. 3 is a sectional view along the line 3—3 of FIG. 1.
Figure 2:
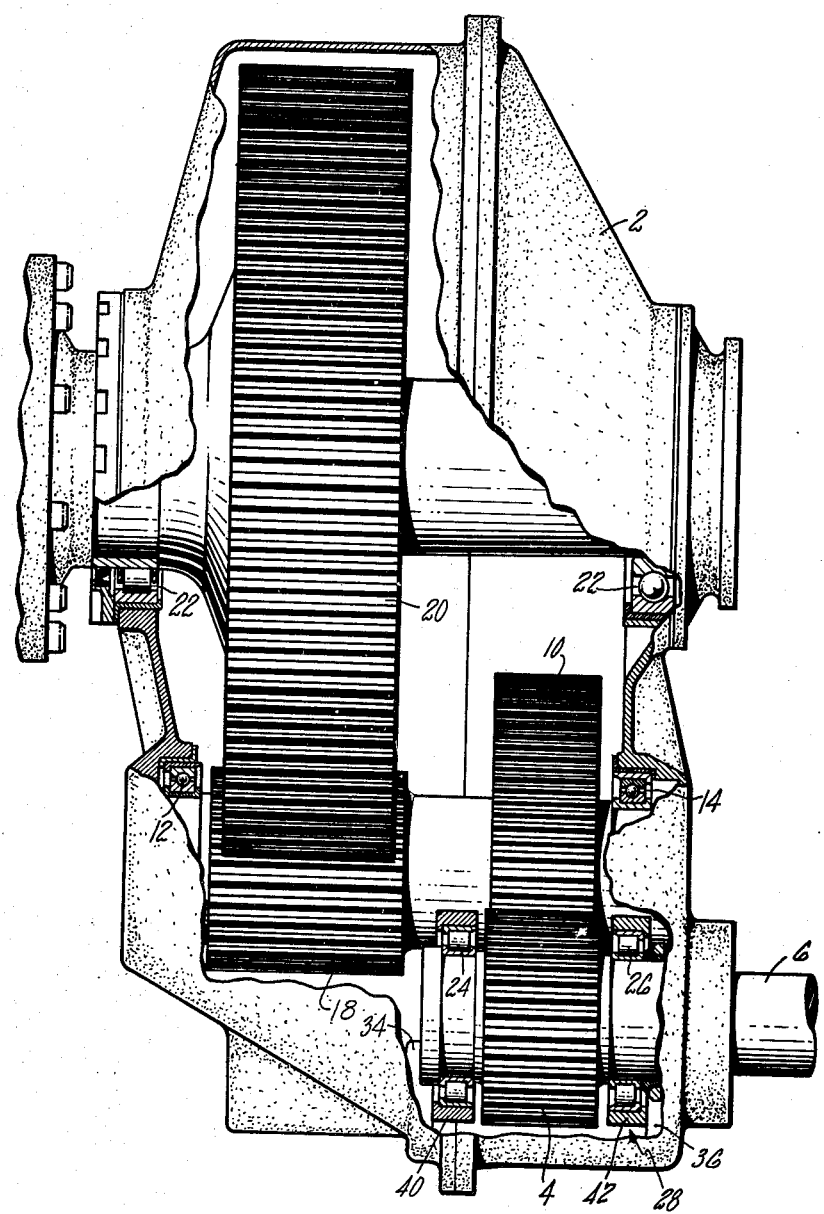
FIG. 2 is a side elevation of the gear box with parts of the box broken away to show the gear train and some of the bearing structures.

As shown the drive mechanism which may be used, for example, between an engine and a propeller in an aircraft includes a gear box 2 in which is journaled the input pinion 4 usually mounted on an extension of the engine shaft 6. This input gear meshes with two axially spaced idler gears 8 and 10 journaled in bearings 12 and 14, respectively, in the gear box. Integral with the idler gears are driving gears 16 and 18 on the same axis of the idler gears and normally of smaller diameter as shown. These driving gears are in mesh with a large diameter output gear 20 also journaled in the gear box on bearings 22. This provides a speed reduction from the engine input pinion to the propeller driven by the output gear 20.

To assure an equal torque distribution between the two idler gears the input pinion 4 is journaled in bearings 24 and 26 at opposite ends of the pinion in a yoke system 28 that in turn is journaled in the gear box on spaced parallel hinge pins 30 and 32 supported in lugs 34 and 36 on the gear box. With rotation of the pinion in the direction shown the location of the hinge pin 30 which is the pivot pin is such that the resultant load line from the points of mesh between the pinion and the idlers extends through the pinion axis and the center line of the pin 30. This pin is properly sized to provide a pivotal support for the yoke system without any looseness.

To permit the necessary pivotal movement of the yoke system so that the pinion may float so as to center itself between the two idlers to equalize the torque split, the other pin 32 is several thousandths of an inch smaller than the pin receiving holes in the yoke system. This clearance is enough to permit the necessary swing of the pinion about pin 30 for an even torque split. With oil under pressure supplied to the pin mounts, the oil will effectively damp any vibrations of the yoke without effecting the movement of the yoke to center the pinion.

Provision may be made for adapting the device for a reversal of direction of pinion rotation by making the size of the holes in the yoke system that receive the pins all of the same size and locating the holes for pin 32 such that if the direction of the drive is reversed the resultant load line would pass through the pinion axis and that of pin 32. If this is done then pins 30 and 32 are exchanged, the axis A where pin 30 is normally located would be the loose pin axis and the axis B would be the pivotal axis of the yoke system. With the drive pinion direction reversed, this would permit the device to operate as above described but with the drive in the opposite direction.

The yoke system as above described preferably consists of two yoke elements 40 and 42 one at each end of the pinion each element having spaced holes 44 and 46 to receive the pins 30 and 32 and each element supporting one of the bearings 24 and 26. When the yoke system is made in this manner, with each element free to pivot individually about the pin 30, the pin centers itself for effective true contact for the full length of the pinion and the idlers.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A compound power gearing including:
   a gear box;
   an input pinion in said box;
   a pair of idler gears on parallel axes in said box and meshing with said pinion;

an output shaft driven from idler gears and mounted in said box;

a yoke supporting said pinion for rotation in said box;

a hinge pin carried by said box parallel to the axis of said pinion and pivotally supporting said yoke in such a manner that said yoke may pivot about said pin; and a second pin spaced from and parallel to said hinge pin and engaging said box and yoke to limit the pivotal movement of the yoke about the hinge pin.

2. A compound power gearing as in claim 1 in which the second pin extends through openings in the yoke with a freedom of movement to permit and limit the desired pivotal movement of the yoke.

3. A compound power gearing as in claim 1 in which the yoke comprises a pair of yoke elements one at each end of the input pinion gear, each element having a bearing for the pinion and spaced parallel openings to receive the two pins.

4. A compound power gearing as in claim 1 in which each idler has an associated driving gear from the same axis and an output gear journaled in the box engages these driving gears.

* * * * *